(12) United States Patent
Hershey et al.

(10) Patent No.: US 7,154,934 B2
(45) Date of Patent: Dec. 26, 2006

(54) ROBUST, LOW COMPLEXITY COMMUNICATIONS SYSTEM WITH INTERFERENCE MITIGATION

(75) Inventors: John Erik Hershey, Ballston Lake, NY (US); Ralph Thomas Hoctor, Saratoga Springs, NY (US)

(73) Assignee: General Electric Company, Niskayuan, NY (US)

(*) Notice: Subject to any disclaimer, the term of this patent is extended or adjusted under 35 U.S.C. 154(b) by 750 days.

(21) Appl. No.: 09/825,776

(22) Filed: Apr. 5, 2001

(65) Prior Publication Data

US 2002/0172261 A1 Nov. 21, 2002

(51) Int. Cl.
*H04B 1/707* (2006.01)
*H04L 27/00* (2006.01)

(52) U.S. Cl. ...................... 375/141; 375/259

(58) Field of Classification Search ............. 375/130, 375/140, 259, 346, 347, 349, 141; 455/273
See application file for complete search history.

(56) References Cited

U.S. PATENT DOCUMENTS

| 4,121,216 A | * | 10/1978 | Bunch et al. ............... 342/424 |
| 4,388,723 A | * | 6/1983 | Keen ............................ 375/136 |
| 5,761,238 A | | 6/1998 | Ross et al. |
| 5,959,980 A | * | 9/1999 | Scott .............................. 370/280 |
| 6,141,373 A | * | 10/2000 | Scott .............................. 375/150 |

* cited by examiner

*Primary Examiner*—Jay K. Patel
*Assistant Examiner*—David B. Lugo
(74) *Attorney, Agent, or Firm*—Fletcher Yoder

(57) ABSTRACT

A system for short range communications includes a transmitter capable of transmitting a colored noise-like preamble. A receiver receives the colored noise-like preamble and the receiver includes an antenna with an antenna pattern. A direction of the antenna is controllable by the receiver. A signal processor is connected to and responsive to the receiver. The signal processor detects and estimates the strength of the colored noise-like preamble.

7 Claims, 6 Drawing Sheets

ROBUST, LOW COMPLEXITY COMMUNICATIONS SYSTEM WITH INTERFERENCE MITIGATION

BACKGROUND OF THE INVENTION

This invention generally relates to a spread spectrum communication system and, more particularly, to narrowband interference mitigation for a spread spectrum communication system using electronic processing of low complexity.

Industrial spread spectrum communications have benefited greatly from the rules of the U.S. Federal Communications Commission (FCC) Part 15 relating to unlicensed spread spectrum communications. The advent and universal acceptance of Industrial, Scientific, and Medical (ISM) communications has benefited many organizations faced with a requirement to transport data over short distances. Worldwide response has been extremely positive for the ISM communications of data over short distances. For example, the ISM band from 2400–2483.5 MHz is almost universally available.

Spread spectrum communications are often asymmetric in cost and complexity. For example, spread spectrum signals can be generated using circuitry of relatively low complexity. However, detection and successful demodulation of such signals is typically a complex and expensive task. The cost/complexity asymmetry is especially true in an interference environment. Since the communications are unlicensed and quite often used to support host missions on mobile platforms, it is prudent to plan for the contingency that a relatively strong narrowband interfering signal ("interferer") must be removed or excised in order to gain a sufficient signal-to-interferer-plus-noise ratio for the requisite data transportation quality. Therefore, a desire exists for systems that can be used to enable short-range spread spectrum communications using circuits and signal processing techniques of low complexity.

BRIEF SUMMARY OF THE INVENTION

In one exemplary embodiment, a communications system is provided comprising a transmission unit and a receiving unit. In one embodiment, the transmission unit comprises a noise source for generating a noise signal. A signal generator is connected to the noise generator and generates a colored noise-like preamble from at least the noise signal. A modulator is connected to the signal generator and modulates the colored noise-like preamble. A switching device has at least a first input, a second input and an output. The first input is connected to the modulator. An ISM spread spectrum modulator is connected to the second input of the switching device and provides an ISM transmission signal. A transmitter is connected to the output of the switching device. When the switching device is in a first position, the colored noise-like preamble is provided as a transmitter output signal. When the switching device is in a second position, the ISM transmission signal is provided as the transmitter output signal. The colored noise-like preamble is transmitted by the transmitter before the ISM transmission signal. In one embodiment, the receiving unit comprises an antenna that receives the transmitter output signal transmitted by the transmission unit. The antenna adjusts an antenna pattern for improving reception of the transmitter output signal by the transmission unit. A signal processor is connected to the antenna. The antenna produces an antenna output signal that includes the antenna pattern and the transmitter output signal. The signal processor evaluates the antenna output signal and determines at least the presence of the colored noise-like preamble in the antenna output signal.

DETAILED DESCRIPTION OF THE INVENTION

In one embodiment, a communication system includes an ISM transmission unit 100 that creates a preamble to a spread spectrum transmission and a ISM receiver unit 500, 600 that recognizes the preamble received from the ISM transmission unit 100. Such that the preamble complies with various governmental regulations pertaining to spread spectrum communications, the preamble also spreads energy over a wide frequency band.

Figure 1:
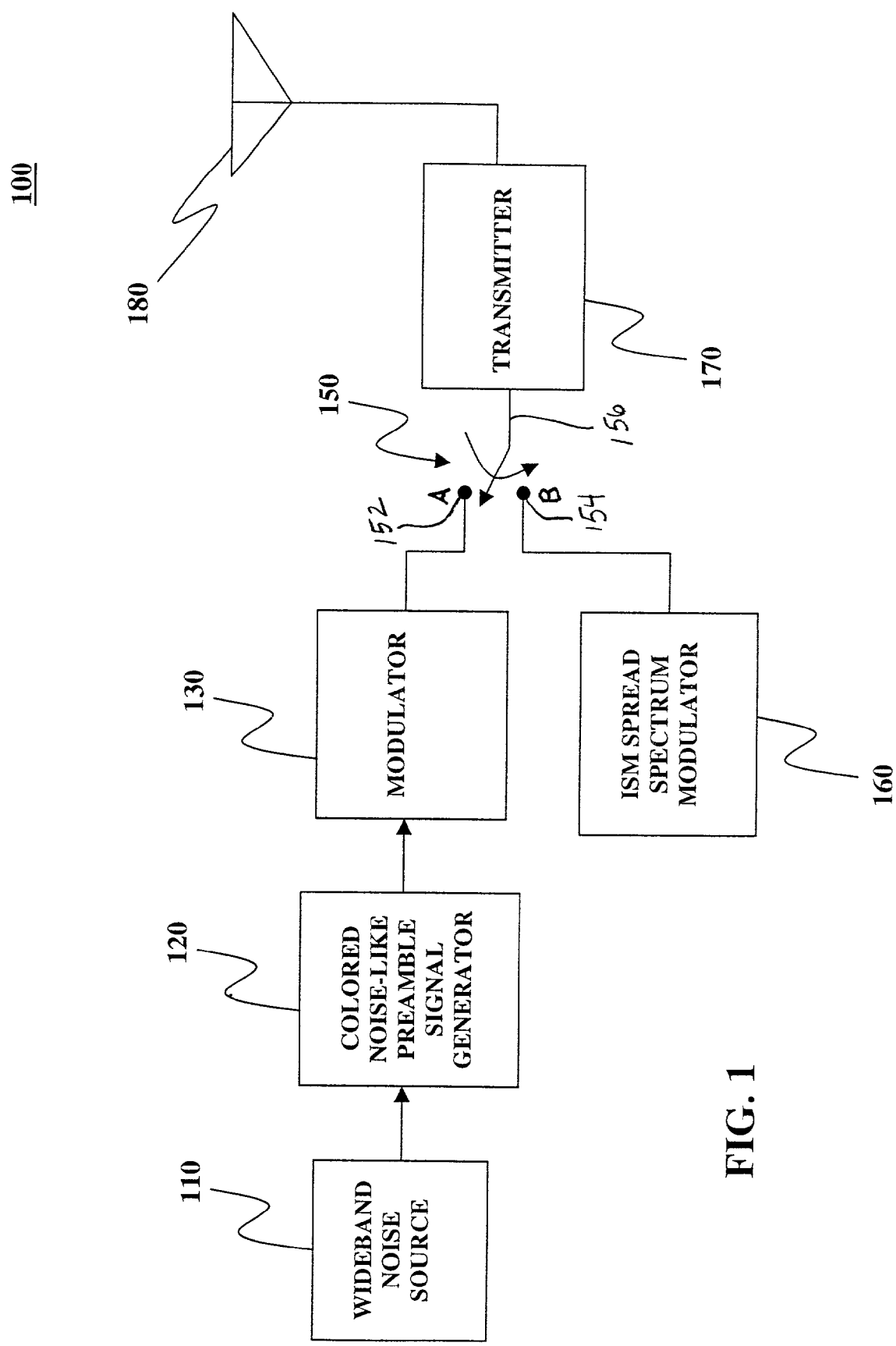
FIG. 1 is a block diagram view of one exemplary embodiment of a transmitter for ISM transmissions.

As shown in FIG. 1, one representative embodiment of an ISM transmission unit 100 creates an ISM transmission that is preceded by a spectrally colored noise-like preamble. In one embodiment, colored noise comprises a signal where the power spectral density of the noise is not substantially flat, "white", over a significant bandwidth of the preamble. An output signal of a noise source 110 is input to a signal generator 120 that generates sampled signal values of a colored noise-like preamble. It should be appreciated that, in one embodiment, that the noise source 110 comprises a broadband noise source. The sampled signal values output from the signal generator 120 are input to a modulator 130 that modulates the sampled signal values. In one embodiment, the modulator 130 converts the sampled signal values into a form suitable for transmission, such as, for example, heterodyning or shifting the sampled signal values to a higher frequency for transmission. An output signal from the modulator 130 is connected to a switch 150. As shown in FIG. 1, in one embodiment, the switch 150 comprises a two-position switch having a first input 152 and a second input 154. In the embodiment shown in FIG. 1, the first input 152 is connected to the modulator 130 and an ISM spread spectrum modulator 160 is connected to the second input 154 of the switch 150. In one embodiment, the switch 150 is activated by a timer (not shown) that allows the output signal from the modulator 130 to be passed to the antenna 180 for a predetermined amount of time before the ISM spread spectrum modulator 160 is connected to the antenna 180. When the switch 150 is in position A, the output signal from the modulator 130 via the first input 152 is passed to the transmitter 170 via the output 156. When in position A, the transmitter 170 drives an antenna 180 with an output signal from the modulator 130. When the switch 150 is in position B, the output signal of the ISM spread spectrum modulator 160 is supplied from the second input 154 to the transmitter 170 via the output 156 of the switch 150. When in position B, the transmitter 170 drives the antenna 180 with the output signal from the ISM spread spectrum modulator 160. In operation, the ISM transmission unit 100 operates by starting with switch 150 in position A whereby the spectrally colored noise-like preamble is provided to the signal transmitter 170 and transmitted via the antenna 180. After the spectrally colored noise-like preamble is transmitted, the conventional ISM transmission is commenced after the switch 150 is placed in position B. It should be appreciated that the switch 150 can be electronically programmed using, such as for, example, software or a timing device, to switch from position A to position B.

Figure 2:
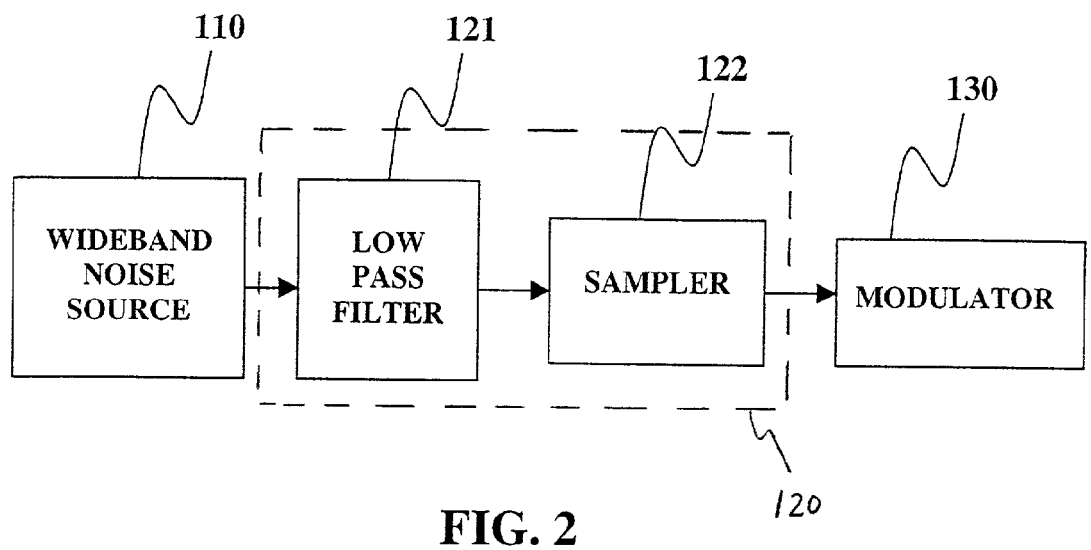
FIG. 2 is a block diagram view one exemplary embodiment for generating sampled signal values of a colored noise-like preamble.

As shown in FIG. 2, one exemplary embodiment of the signal generator 120 that generates sampled signal values of a colored noise-like preamble comprises a low pass filter 121 that colors the noise input from the noise source 110. In one embodiment, the noise input is colored such that the power spectral density of the noise is not substantially flat, "white", over the significant bandwidth of the signal. The output signal from the low pass filter 121 is input to a sampler 122 that produces a signal composed of periodic samples of the output signal of the colored noise from the low pass filter 121. The output signal of the sampler 122 is input to the modulator 130. In the embodiment shown in FIG. 2, the broadband noise signal from the noise source 110 is severely narrowed in spectral content using the low pass filter 121 in order to induce a significant inter-sample correlation.

Figure 3:
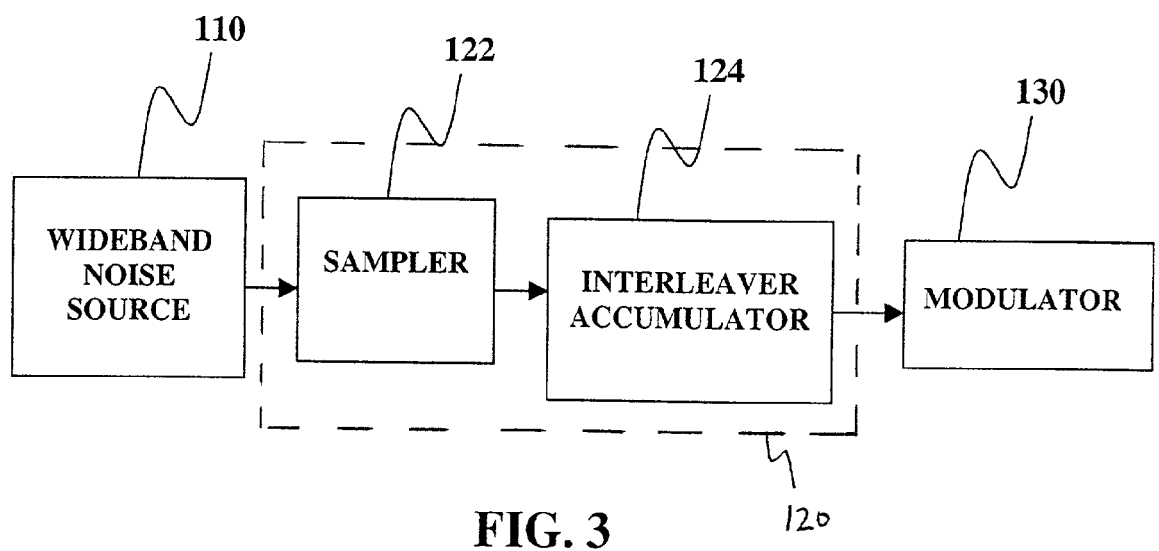
FIG. 3 is a block diagram view of another exemplary embodiment for generating sampled signal values of a colored noise-like preamble.

In another embodiment, as shown in FIG. 3, the colored noise-like preamble comprises a bandwidth closer to the original noise-like signal provided by the noise source 110. It should be appreciated that, in one embodiment, the noise source 110 comprises a broadband noise source. In FIG. 3, the output signal from the noise source 110 is input to a sampler 122 that produces a signal composed of periodic samples from the output signal of the noise source 110. The output signal from the sampler 122 is provided to an interleaver accumulator 124 that produces a signal composed of interleaved sequences of samples of colored noise. The output signal of interleaver accumulator 124 is input to the modulator 130.

If it is assumed that the white noise process is a zero mean, unit variance, memoryless Gaussian process with samples $\{g(n)\}$, the interleaver accumulator 124 forms a colored noise output signal $\{s(n)\}$ by forming:

$$s(i)=\alpha s(i-d)+(1-\alpha)g(i), \; 0<\alpha<1$$

The signal power of the output signal $\{s(n)\}$ is $$\sigma_s^2 = \frac{1-\alpha}{1+\alpha}$$

and the autocorrelation coefficient of lag k, $\alpha(k)$, is $$\rho(k) = \begin{cases} \alpha^{|d/k|}, & d \mid k \\ 0, & \text{otherwise} \end{cases}$$

The normalized power spectral density of $\{s(n)\}$, $\Phi_s/\sigma_s^2$, is $$\begin{aligned}\Phi_s/\sigma_s^2 &= \sum_{k=-\infty}^{\infty} \rho(k)e^{-j2\pi fk} \\ &= -1 + \sum_{k=0}^{\infty} \rho(k)e^{-j2\pi fk} \\ &= -1 + 4\sum_{m=0}^{\infty} \alpha^m \cos(2\pi f dm) \\ &= -1 + \frac{1-\alpha\cos(2\pi fd)}{1+\alpha^2 - 2\alpha\cos(2\pi fd)}\end{aligned}$$

illustrating the coloring of the noise signal spectrum. It should be appreciated that the ISM transmission unit 100 can be adjusted to the requirements of any applicable governmental regulations such that the preamble signal is sufficiently spread for ISM usage. In one embodiment, this adjustment can be made by selecting the appropriate values for d and $\alpha$. It should be appreciated, in one embodiment, that the symbol d represents the span or memory of the interleaver accumulator 124 as described in equation hereinabove, and the symbol $\alpha$ represents the degree to which the noise is colored as described in the same equation hereinabove. In one representative embodiment, for example, setting d=25 and $\alpha$=0.95 will divide the signaling energy into 12 lobes over the baseband frequency spectrum.

Figure 4:
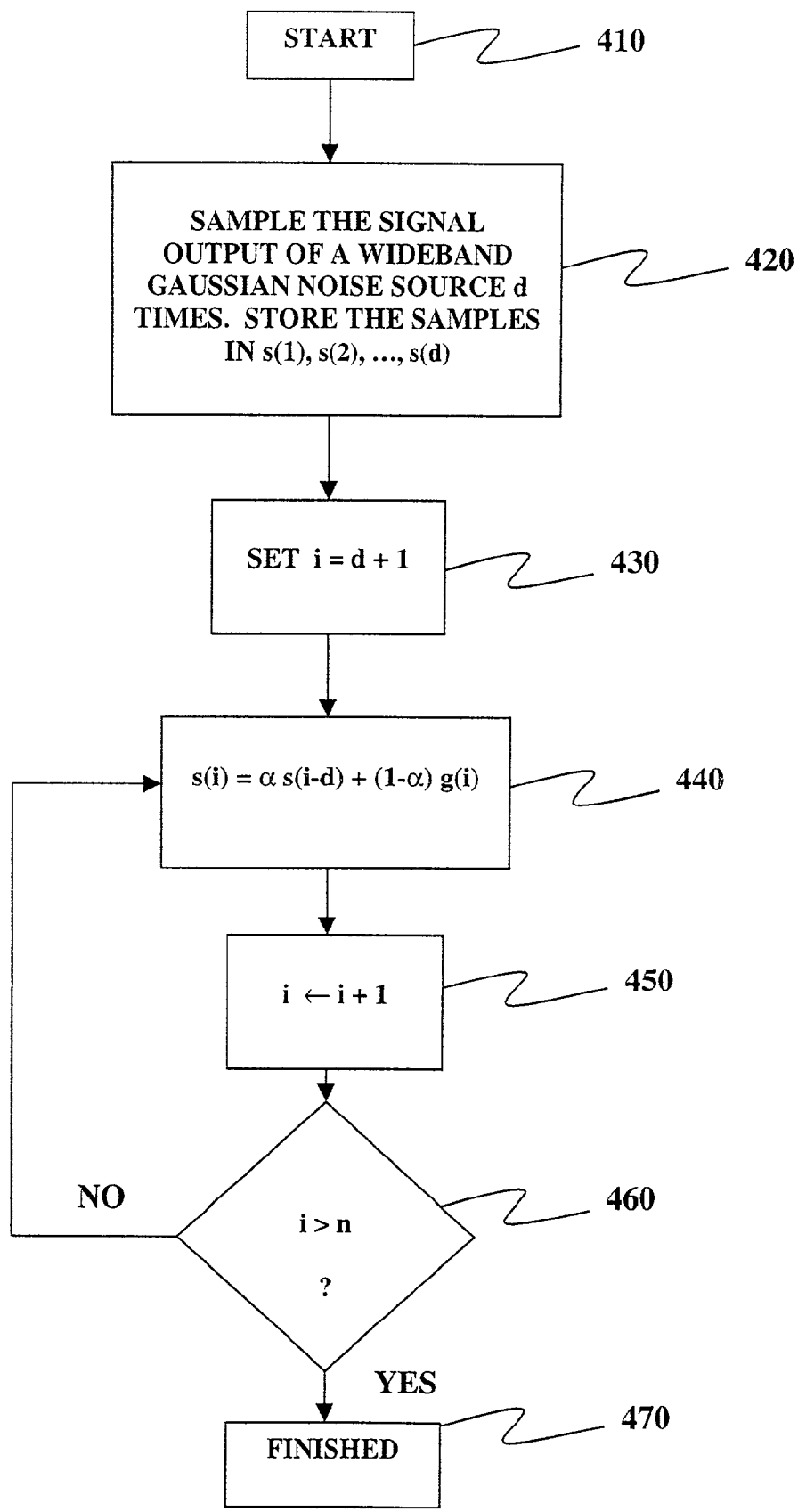
FIG. 4 is a flow diagram of the one exemplary method of operation forming the n-samples of a colored noise-like preamble using an interleaving accumulator.

In one embodiment as shown in FIG. 4, the interleaver accumulator 124 produces n-samples of the colored noise-like preamble. The interleaver accumulator 124 starts the process (step 410). The noise source 110 is sampled "d" times and the samples are stored in s(1), s(2), . . . s(d) (step 420). It should be appreciated that, in one embodiment, the noise source 110 comprises a broadband Gaussian noise source. An index "i" is set to the value d+1 (step 430). In step 440, the i-th sample "s(i)" of the colored noise-like preamble is formed by the interleaver accumulator 124 by computing:

$$s(i)=\alpha s(i-d)+(1-\alpha)g(i).$$

The index "i" is incremented by unity (step 450). A test is made to determine if the index "i" exceeds a predetermined value "n". In one embodiment, the value "n" comprises a default value of the number of samples and can be selected such that the preamble transmission time (the number of samples "n" divided by the symbol transmission rate) is about 100 milliseconds (ms). If index "i" does exceed the predetermined value "n", the process finishes (step 470). If the index "i" does not exceed the predetermined value "n", the next i-th "s(i+1)" sample is formed (step 440) and the process continues.

When not receiving an ISM transmission, an ISM receiver unit 500, 600 constantly scans for the presence of the colored noise-like preamble that is transmitted by the ISM transmission unit 100. In one embodiment, the scanning can comprise moving a directed spatial null around and testing for the presence of the colored noise-like preamble by computing a lag d autocorrelation of a output signal from the ISM receiver unit 500. In one embodiment, the complexity and costs are kept down by using an arc-sine law to process the output signal and determine the presence of the colored noise-like preamble.

Figure 5:
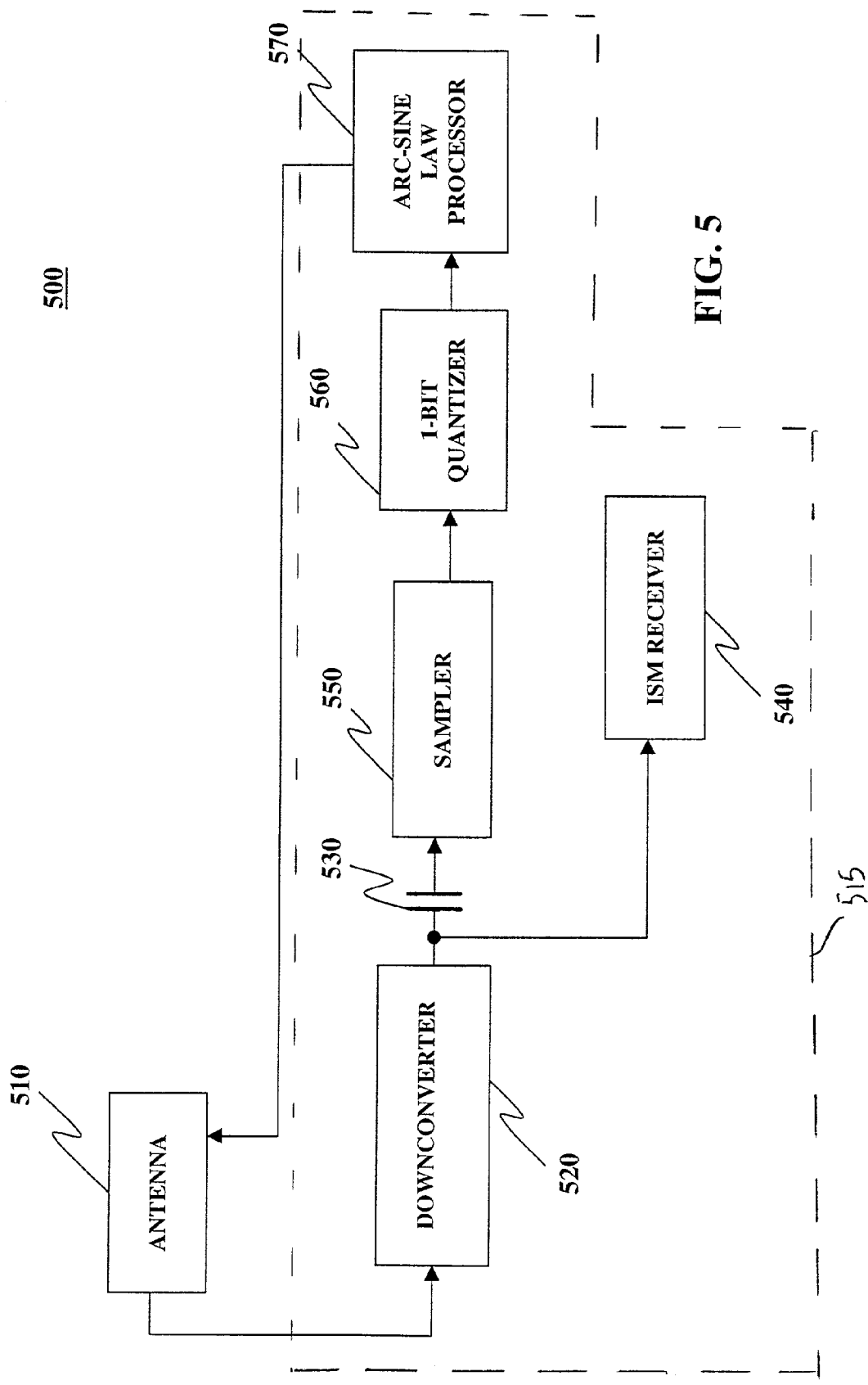
FIG. 5 is a block diagram view of one exemplary embodiment of an ISM receiver with augmented capability of searching for the transmitted spectrally colored noise-like preamble and mitigating an off-angle narrowband interferer.

In one embodiment as shown in FIG. 5, an ISM receiver unit 500 is provided that receives transmissions from the ISM transmitting unit 100. In one embodiment, an antenna 510 continually rotates a spatial null. It should be appreciated, in one embodiment, that the spatial null is part of an antenna pattern where the antenna gain is substantially zero or equal to zero. In addition, it should be appreciated that the antenna 510 adjusts an antenna pattern to improve reception of the transmission received from the ISM transmitting unit 100. Also, the improvement of the reception of the transmission received from the ISM transmitting unit includes receiving the transmission that has a stronger signal than a previously received transmission. In one embodiment, the adjustment of the antenna pattern 510 can comprise rotating a spatial null. The antenna 510 is connected to a signal processor 515. The signal from the antenna 510 is provided to a downconverter 520 of the signal processor 515. The output signal from the downconverter 520 is provided to an ISM receiver 540 of the signal processor 515. In one embodiment, the ISM receiver 540 is a conventional ISM receiver. In another embodiment, the output signal from the downconverter 520 is provided to a capacitor 530 that blocks any DC level in the signal. It should be appreciated that, in even another embodiment, the capacitor 530 is not provided in the ISM receiver unit 500, and as such, DC levels are not blocked from the signal. The signal provided by the capacitor 530 is then input to a sampler 550 of the signal processor 515. The output signal from the sampler 550 is provided to a one-bit quantizer 560 of the signal processor 515. The one bit output signals from the one-bit quantizer 560 are input to an arc-sine law processor 570 of the signal processor 515, and the arc-sine law processor 570 searches for the presence of the colored noise-like preamble. If the arc-sine law processor 570 does not detect the colored noise-like preamble then the arc-sine law processor 570 instructs the antenna 510 to continue to rotate the spatial null. If the arc-sine law processor 570 detects the colored noise-like preamble, the arc-sine law processor 570 instructs the antenna 510 to adjust the angular placement of the spatial null in order to maximize the reception of the colored noise-like preamble. In so doing, the ISM transmission following the spectrally colored noise-like preamble will be received under an optimal signal-to-noise condition.

Figure 6:
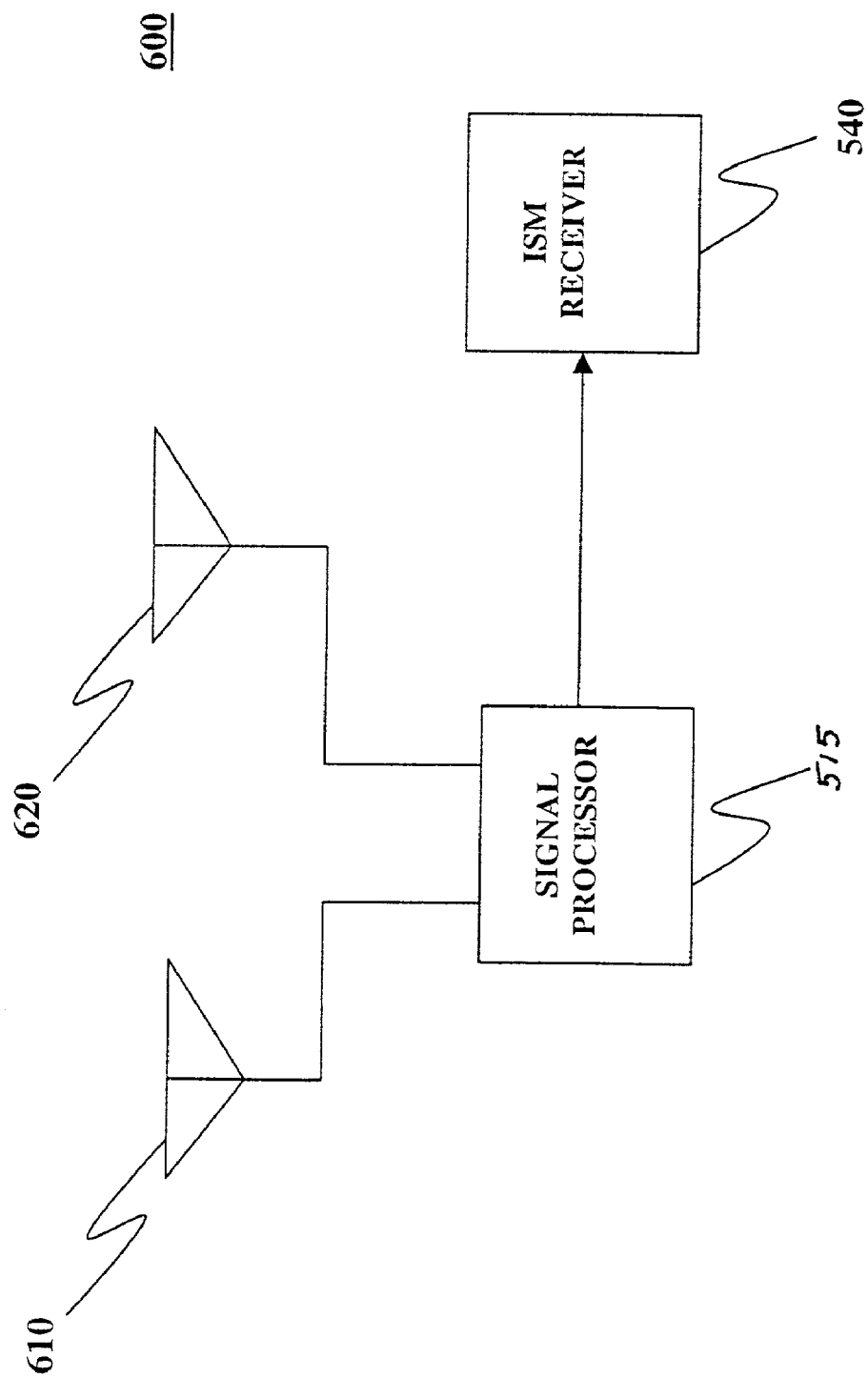
FIG. 6 is a block diagram of another exemplary embodiment of an ISM receiver having a two antenna system with a signal processing module.
Figure 7:
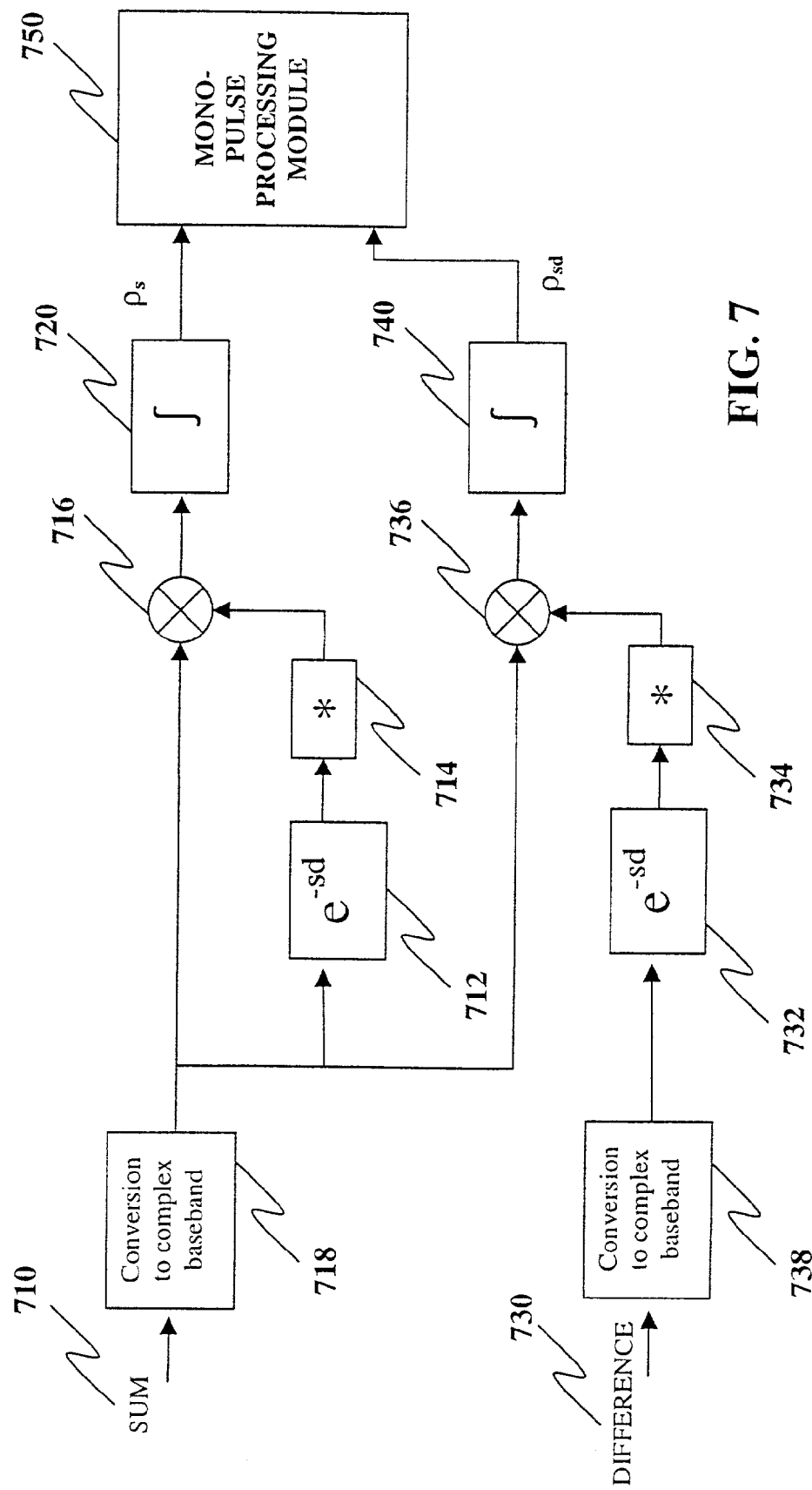
FIG. 7 is a block diagram view of one exemplary embodiment of a signal processing submodule within the signal processing module.

In FIG. 6, another embodiment of the ISM receiving unit 600 receives transmissions from the transmitter 100. In this embodiment, the colored noise-like preamble of the transmitter 100 is highly correlated to temporal lag d. The ISM receiving unit 600 includes antennas 610 and 620 that have antenna patterns exhibiting a single mainlobe. In one embodiment, the antennas 610, 620 are spatially separated on the order of a wavelength or more, and the mainlobes of the antennas 610, 620 are oriented in slightly different directions. The output signals of the antennas 610, 620 are processed in signal processor 515 that forms a sum signal and a difference signal from the output signals of the antennas 610, 620. The sum signal corresponds to a beam pattern in the far field and is designated the sum beam 710 (FIG. 7). The difference signal corresponds to a beam pattern in the far field and is designated the difference beam 730 (FIG. 7). The output signal from the signal processor 515 is provided to the ISM receiver 540.

Typically, the angle of arrival of a signal can be estimated from comparison of the sum beam 710 and difference beam 730. This procedure is known as monopulse angle estimation. The standard angle estimation procedure can be modified to estimate the angle-of-arrival of a colored noise signal. In FIG. 7, the signal processing performed by the signal processor 515 that follows the formation of the sum beam 710 and difference beam 730 is provided. From the antennas 610 and 620, the sum beam 710 is input to unit 718 that converts the sum beam 710 to a complex baseband. In one embodiment, the unit 718 is not provided and the sum beam 710 is provided directly to a delay unit 712 via the antennas 610 and 620. The output of the unit 718 is input to a delay unit 712. The output signal of the delay unit 712 is provided to a complex conjugator 714. In one embodiment, the complex conjugator 714 is used to negate the imaginary portion of the output signal from the delay unit 712. The output signal of the complex conjugator 714 is multiplied by the output signal from unit 718 (complex baseband converted sum beam 710) in a multiplier 716. The output signal of the multiplier 716 is provided to an integrator 720. The output signal of the integrator 720 is denoted $\rho_s$ and is input to the monopulse processing module 750. From the antennas 610 and 620, the difference beam 730 is input to unit 738 that converts the difference beam 730 to a complex base band. In one embodiment, the unit 738 is not provided and the difference beam 730 is provided directly to a delay unit 732 via antenna 610 and 620. The output from the unit 738 is input to a delay unit 732. The output signal of the delay unit 732 is input to a complex conjugator 734. In one embodiment, the complex conjugator 734 is used to negate the imaginary portion of the output signal from the delay unit 732. The output signal from the complex conjugator 734 is multiplied by the complex baseband version of the sum beam 710 in a multiplier 736. The output signal from the multiplier 736 is provided to an integrator 740. The output signal from the integrator 740 is denoted $\rho_{sd}$ and is input to the monopulse processing module 750. The monopulse processing module 750 calculates the angle of arrival, $\beta$, from the $\rho_s$ signal and the $\rho_{sd}$ signal corresponding to the lag or delay d specified in the delay units 712 and 732. The monopulse processing module 750 determines the angle of arrival, $\beta$, by calculating the ratio of $\rho_{sd}$ to $\rho_s$. This ratio is an estimate of the ratio of the response of the difference beam 730 at the angle-of-arrival of the signal to the response of the sum beam 710 at the angle-of-arrival of the signal. This ratio can be converted to the angle-of-arrival estimate by a look-up table this is obtained from the specific sum beam 710 and difference beam 730 patterns that are produced by antennas 610 and 620 as combined by signal processor 515. Once $\beta$ is determined, if the lag or delay d corresponds to the colored noise-like preamble, the monopulse processing unit 750 causes a high gain lobe of the antennas 610 and 620 to be steered in the direction of $\beta$. If the lag or delay d corresponds to the narrowband jamming process and/or narrow bandwidth interfering signal, the monopulse processing unit 750 causes an antenna pattern, such as, for example, a spatial null to be steered to the antennas 610, 620 in the direction of $\beta$. In one embodiment, since the interfering signals have a narrow bandwidth, the correlation function is periodic. Therefore, if the lag or delay d is a multiple of the period of the narrow bandwidth interfering signal, the angle-of-arrival of the interfering signal can be determined. Further, in one embodiment, the steering of the antennas 610 and 620 is provided by forming a weighted difference of first antenna output a1(t) and second antenna output a2(t) using the following equation: Difference = K1 · a1(t) − K2 · a2(t). In one embodiment, a null will exist at angle $\theta$ in the difference beam 730 when the ratio of K1/K2 is equal to the ratio of b2(θ)/b1(θ) where b1 and b2 are the beam patterns of the antennas 610 and 620 at the temporal frequency of the interfering signal. When the interfering signal has a narrow bandwidth, the difference beam 730 could be used to receive a desired signal when nulling out the narrow bandwidth interfering signal. To steer antennas 610 and 620 having an antenna pattern with high gain lobes, such as, for example, wideband, a time delay is used to compensate for the delay difference between the two elements. In one embodiment, one element would be delayed with respect to the other element so that the signals coming from the desired direction are added in-phase regardless of the frequency of the signals. It should be appreciated that this technique is a standard beamforming technique to one skilled in the art.

What is claimed is:

1. A communications system, comprising:
   a transmission unit cornprising:
   a noise source for generating a noise signal;
   a signal generator connected to the noise source and generating a colored noise like preamble from at least the noise signal;
   a modulator connected to the signal generator for modulating the colored noise like preamble;
   a switching device having at least a first input, a second input and an output, the first input being connected to the modulator;
   an ISM spread spectrum modulator connected to the second input of the switching device and providing an ISM transmission signal; and
   a transmitter connected to the output of the switching device wherein when the switching device is in a first position the colored noise-like preamble is provided as a transmitter output signal and when the switching device is in a second position the ISM transmission signal is provided as the transmitter output signal wherein the colored noise-like preamble is transmitted by the transmitter before the ISM transmission signal;
   a receiving unit comprising:
   an antenna for receiving the transmitter output signal transmitted by the transmission unit, the antenna adjusting an antenna pattern for improving reception of the transmitter output signal by the transmission unit;
   a signal processor connected to the antenna, the antenna producing an antenna output signal including the antenna pattern and the transmitter output signal, the signal processor evaluating the antenna output signal and determining at least the presence of the colored noise-like preamble in the antenna output signal.

2. The communications system of claim 1, wherein the signal processor comprises:
   a downconverter connected to the antenna for downconverting the antenna output signal;
   an ISM receiver connected to the downconverter for receiving the antenna output signal and receiving the ISM transmission signal when the ISM transmission signal is present in the antenna output signal;
   a sampler connected to the downconverter for sampling the antenna output signal;
   a one-bit quantizer connected to the sampler for quantizing the antenna output signal into one-bit segments; and
   an arc-sine law processor connected to the one-bit quantizer and antenna for determining the presence of the colored noise-like preamble in the antenna output signal and the arc-sine law processor instructing the antenna to at least cause movement of the antenna pattern.

3. The communications system of claim 2, wherein the receiving unit further comprises a capacitor connected between the downconverter and the sampler for removing any DC levels in the antenna output signal.

4. The communications system of claim 1, wherein the noise source comprises a broadband noise source.

5. The communications system of claim 1, wherein the transmitting unit further comprises an antenna connected to the transmitter wherein the transmitter drives the antenna with the output signal.

6. The communications system of claim 1, wherein the antenna comprises a plurality of antennas, for receiving the transmitter output signal transmitted by the transmission unit and the receiving unit further comprising an ISM receiver connected to the signal processor for receiving the antenna output signal and receiving the ISM transmission signal when the ISM transmission signal is present in the antenna output signal.

7. The communications system of claim 6, wherein the antenna output signal comprises a sum beam and a difference beam, the signal processor receiving the sum beam and the difference beam and the signal processor comprising:
   a first delay unit connected to the plurality of antennas and receiving the sum beam, the first delay unit delaying the sum beam;
   a first complex conjugator connected to the first delay unit for conjugating the sum beam and providing a first conjugator output signal;
   a first multiplier connected to the first complex conjugator and receiving the sum beam, the first multiplier multiplying the sum beam with the first conjugator output signal to produce a first multiplier output signal;
   an first integrator connected to the first multiplier and integrating the first multiplier output signal and providing a first integrator output signal;
   a monopulse producing module connected to the first integrator;
   a second delay unit connected to the plurality of antennas and receiving the difference beam, the second delay unit delaying the difference beam;
   a second complex conjugator connected to the second delay unit for conjugating the difference beam and providing a second conjugator output signal;
   a second multiplier connected to the second complex conjugator and receiving the sum beam, the second multiplier multiplying the sum beam with the second complex conjugator output signal to produce a second multiplier output signal; and
   a second integrator connected to the second multiplier and the monopulse producing module, the second integrator integrating the second multiplier output signal and providing a second integrator output signal wherein the monopulse producing module calculates an angle of arrival from the first integrator output signal and the second integrator output signal.

* * * * *